July 25, 1967  T. H. HOULE  3,333,111
PULSE SWITCHING SYSTEM
Filed July 6, 1964

INVENTOR.
TIM H. HOULE
BY Andrus & Starke
ATTORNEYS

United States Patent Office 3,333,111
Patented July 25, 1967

3,333,111
PULSE SWITCHING SYSTEM
Tim H. Houle, Wauwatosa, Wis., assignor to A. O. Smith Corporation, Milwaukee, Wis., a corporation of New York
Filed July 6, 1964, Ser. No. 380,351
4 Claims. (Cl. 307—88.5)

This invention relates to a pulse switching system and particularly to a system wherein a train of electrical pulses is created by rapid actuation of a movable contact.

In various control and recording systems, it is often desirable to record the function of a load, provide a control signal in accordance therewith or the like. For example, in gasoline and fuel dispensing system, a record may be made by coupling switch to the output of a flow meter and connecting the switch in a signal transmission and recording circuit at a suitable remote location. The switch is closed and opened for each unit of flow to create a train of pulse signals for actuating a suitable recording means. A highly satisfactory system for flowing fluids employs a switch actuated by a magnet which is cyclically driven by a suitable flow meter. The magnet is periodically aligned with the switch to rapidly and momentarily close the switch and thereby create a pulse. Although such devices are highly satisfactory because of the minimal loading of the meter, the adaptability to intrinsically safe circuitry and the like, it has been found that the count and actuation of the counter is not always directly related to the actual flow; for example, as shown through mechanically driven recording mechanisms and test flows of known quantities.

The present invention is particularly directed to improving the reliability of the transmission system.

The erroneous reading is at least in part due to the phenomenon of contact bounce associated with the rapid actuation of the transmitting switch at the flow meter. The present invention is particularly directed to a coupling and transmitting circuit to eliminate the effects of contact bounce. In one aspect of the invention, an electronic and preferably solid state timing device interconnects the transmitting switch to the counter or other output device in a manner to eliminate the effects of contact bounce while providing a pulse for each switch actuation.

In accordance with this aspect of the present invention, a monostable vibrating circuit of a transistorized construction is employed to provide timed operation and transmission of pulse signals. The monostable vibrating circuit includes an input circuit with the meter operated switch in series with a timing circuit to trigger the circuit upon closing of the switch. The timing circuit has a relatively short time period but of a sufficient length to eliminate the effects of extraneous transient signals. The output of the multivibrating circuit is interconnected with a counting circuit through a suitable relay system where the load has high power requirements or may be interconnected through a transistorized circuit to directly drive a load. When using a relay or the like to increase the power to the load, the output of the multivibrating circuit is preferably connected through a direct coupled emitter follower which will not only isolate the relay from the multivibrating circuit but will provide a clamping action on the relay for arc suppression. This is of substantial practical significance in the metering of fuel and other explosive mediums wherein there is always a danger of gas fumes and the like creating an explosive atmosphere which could result in an explosion as a result of arcing of the relay contacts.

In another aspect of this invention, the coupling circuit may include a capacitor charged by the contacts in one position and discharged to a counting circuit or the like in an alternate position. In this aspect of the invention, a dual position pulsing switch would be employed. In the first normal position, the circuit would be connected in series with a capacitor and a power source to charge the capacitor. The charging time of the capacitor is short in comparison to the length of the time the switch is held in this position. The switch is then moved to the second position whenever it is desired to establish a pulse signal. In the second position, the switch is connected in circuit with a relay to discharge the capacitor into the coil of the relay. The switch is held in the second position for a period longer than that necessary to operate the relay from the capacitor which provides sufficient power therefor after which the switch returns to the first or charging position and thereby completes one cycle. The circuit of the relay is inductive with a time constant which eliminates actuation of the relay as a result of momentary closure thereof. Consequently, the relay circuit functions generally in the same manner as the circuit previously described to eliminate the effect of contact bounce in a three wire switching circuit.

The several features of the present invention as noted above as well as many other advantages will be clearly understood as a result of the following description of the drawing furnished herewith which illustrated a preferred construction of the present invention.

Figures 1, 2:
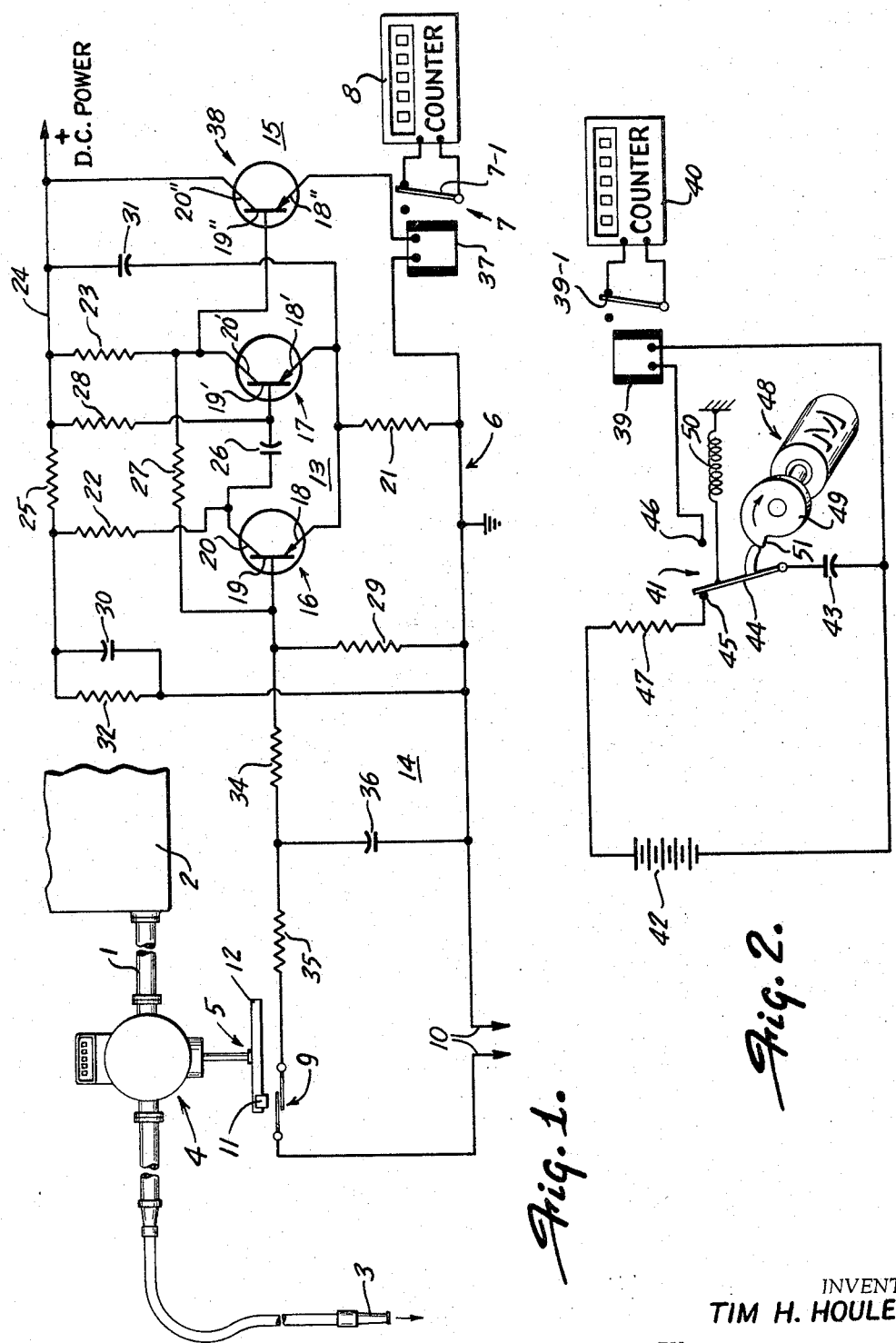
FIG. 1 is a diagrammatic illustration of a gasoline or other fuel dispensing system including a schematic circuit diagram for transmitting a pulse train to a recording mechanism in accordance with the fluid flow.
FIG. 2 is a schematic circuit applied to a double throw, three wire switching system for generating control pulse.

Referring to the drawing, a flow pipe 1 for gasoline or other suitable fluid is shown interconnecting a storage tank 2 with discharge nozzle 3 for supplying fuel to a tank truck or the like, not shown. A flow meter 4 is inserted in the flow line or pipe 1 and is driven in accordance with the flow through the pipe in accordance with the pipe 1. The meter 4 may be of any suitable or well known construction and no further description thereof is given. A magnetically actuated switch assembly 5 is mounted on the meter 4 and driven in accordance there with to periodically open a control circuit 6 in accordance with and in proportion to the flow through pipe 1 An output relay 7 is connected to the output side of th control circuit 6 and is interconnected to actuate a counte 8 or other suitable load. In addition to driving a counte 8 or the like, an automatic printing mechanism or othe recording system may be connected to the output of th control circuit 6 in accordance with any desired func tioning.

The magnetic switch assembly 5 illustrated in the in vention includes a reed switch 9 including overlappin resiliently mounted contact arms interconnected in serie with a D.C. (direct current) power supply 10 to the inpt of the control circuit and forming a part of the contrc circuit 6. The reed switch 9 is diagrammaticaly shown a a conventional "form A" switch which is of a well know and commercially available construction. The switch a sembly 5 further includes an operating or actuating ma net 11 carried by an armature 12 which is connected to b driven by and in accordance with the flow response of th meter 4. Switch assembly 5 which is diagrammatical shown in the drawing may, for example, be constructe in accordance with the magnetic switch structure shown in the copending application of Robert Ryno, S.N. 259,462, filed on Feb. 18, 1963, now Patent No. 3,250,866, entitled Switching Apparatus and assigned to a common assignee herewith. In either event, the rotation of the armature 12 periodically aligns magnet 11 with the contacts 9 and effects a rapid engagement therebetween during the short period of alignment after which the contacts return to the normally open position. Thus, during the closed period, the power supply 10 is connected in a completed circuit to the input of the control circuit 6.

The illustrated control circuit 6 includes a monostable multivibrating section 13 having its input connected by a timing circuit 14 to the series circuit of the contacts 9 and power supply 10. An output coupling circuit 15 including the relay 7 is connected to the output of a multivibrating circuit to provide proper actuation of the load 8, as hereinafter described.

The illustrated monostable multivibrating circuit is of a known transistorized construction including a pair of common emitter connected transistors 16 and 17, shown as PNP type. Transistor 16 is described and corresponding elements of transistor 17 are similarly identified by primed corresponding numbers. Transistor 16 includes the common emitter 18, input signal base 19 and output signal collector 20. A common emitter resistor 21 interconnects emitters 18 and 18' to ground. Collector load resistors 22 and 23 respectively connect the collectors 20 and 20' to a negative power lead 24. If an NPN type transistor were employed, the power lead 24 would be connected to a positive source of voltage in accordance with known theory. A biasing resistor 25 is connected in the lead 24 between the connection to the resistors 22 and 23 to provide proper bias on the respective electrodes.

A coupling capacitor 26 connects collector 20 to the base 19' of transistor 17 and a coupling resistor 27 interconnects the collector 20' of transistor 17 to the base 19 of transistor 16 to provide degenerative coupling between the two circuits. A timing resistor 28 is connected between lead 24 and the base 19' and a biasing resistor 29 is interconnected between the base 19 of transistor 16 and ground. Suitable stabilizing capacitors 30 and 31 and a stabilizing resistor 32 are interconnected in the circuit of the transistors to provide stable reliable operation in accordance with known circuit connections.

The monostable multivibrating circuit 13 is initially biased to what is designated as the off position with the transistor 16 non-conducting and transistor 17 conducting. Transistor 16 is biased off as a result of a voltage division across the resistors 23, 27 and 29. Transistor 17 is similarly biased on as a result of the voltage connection of the resistor 28 to line 24. When an input signal is applied to the base of the transistor 16 of a sufficient negative level, transistor 16 conducts and in accordance with known operation, the transistor 17 will instantly turn off. The feedback circuit through the resistor 27 maintains a forward bias on the transistor 16 to hold the transistor 16 conducting as long as transistor 17 is non-conducting. When the transistor 16 conducts, current flows through the timing circuit provided by capacitor 26 and resistor 28 which in turn builds a negative voltage on the base of the transistor 17. After a selected period the voltage will rise to a level to again turn on transistor 17 and result in a drop in the voltage fed back to the transistor 16. When both the input voltage and the feedback voltage decrease sufficiently, transistor 16 turns off and the circuit is then in the initial position ready for a subsequent timing sequence after the capacitor has returned to its initial charge.

The input circuit to the monostable multivibrating section 13 includes the timing circuit 14 which in the illustrated embodiment of the invention includes a coupling resistor 34 in series with a resistor 35 connected between one side of the contacts 9 and the base of transistor 16. A filtering capacitor 36 is connected between ground and the common junction of the coupling resistor 34 and the resistor 35. The resistor 35 and capacitor 36 provide a filtering action to alternating current signals such that the input pulse occasioned by closing of the contacts 9 must be of a specified length.

The above filter, therefore, prevents relatively high voltage transient signals of short duration from triggering the circuit. Transient signals are normally the result of a high impedance source and will thus provide a relatively low current. The circuit has a low impedance input and thus sees the average voltage of the input signal.

In operation, the contacts 9 are closed by the magnet 11 for a sufficient period to generate an operating pulse to the multivibrating circuit 13. Even if the contacts 9 happen to bounce and set up a vibrating signal, the average signal applied to the multivibrating circuit 13 operates of the timing circuit 13 by providing a sufficient current input to trigger the circuit and provide the previously described timed operation whereby transistor 16 conducts and transistor 17 is placed in a non-conducting state.

Output relay 7 includes a winding 37 connected in series with a direct coupled emitter follower transistor 38 which is coupled between ground and the negative power lead 24 in accordance with a known construction. The transistor 38 is similar to the transistors 16 and 17 and the corresponding elements are similarly numbered with double primes. The base 19" is connected to the collector 20' of transistor 17 and the emitter 18' is connected to ground in series with the relay winding 37. While transistor 17 is in its normally conducting state, the voltage of the collector 20' and the base 19" of transistor 38 holds the transistor 38 off. However, when the transistor 17 is turned off, voltage at the collector 20' rises in a negative direction and will turn on the transistor 38; thereby providing operating current to the relay winding 37. The relay 37 is therefore energized for the time period that the transistor 17 is held off. This operation of the relay 37 is for a timed period as set by the monostable multivibrating circuit 13 independently of any contact bounce of the magnetically meter actuated contacts 9.

Energization of the relay winding 37 results in closing of the related relay contacts 7–1 to provide a single positive operating signal to the load 8 for the corresponding single operation of switch 9, not withstanding a plurality of contact closures and openings by the single operation.

Relay 7 may be of any well known conventional construction which will provide a sufficient or proper power system for proper operation of the load 8. Obviously, the relay 7 should be positive acting without contact bounce which would also provide erroneous operation of the load. Where the load requirements are minimal, the output signal can be amplified by a transistor amplifier or the like to directly operate the load.

In summary, the illustrated embodiment of the invention operates as follows. Whenever flow is established through the pipe 1, the meter 4 is driven in accordance with the volumetric flow therethrough. The switch assembly 5 and particularly the armature 12 will rotate accordingly to periodically and cyclically close the switch contacts 9. As a result of the rapid operation thereof, the contacts 9 may in fact bounce and in effect provide a high frequency opening and closing of the circuit. Such circuit operation has been found to provide a series actuation of a counter mechanism if compensation is not made therefor. In accordance with the present invention, the timing circuit 14 applies the power to the input of the multivibrating circuit 13 whenever the average closure of contacts 9 is for a period to generate a negative operating pulse to the transistor 16. This then triggers the multivibrating circuit 13 which turns off the transistor 17 for a selected period and simultaneously turns on the output transistor 38 to conduct and provide a timed energization of the relay 7. This in turn actuates the load 8 for a corresponding count. The periodic and cyclic closing or actuation of the contacts 9 provides a corresponding reliable actuation of the load 8.

Although the above circuit provides a highly reliable system for isolating a pulse generator having each pulse generated by the opening and closing of a switch, the present invention in its broadest aspects may employ other suitable isolating circuit means. For example, in FIG. 2, a charge and discharge capacitor connection is shown for actuating a pulsing relay in a three wire switching system.

Referring particularly to FIG. 2, a relay 39 is shown interconnected in a pulsing circuit and having contacts 39–1 connected to operate a load such as a counter 40. Generally, the pulsing circuit includes a dual position pulsing switch 41 having one position in which a direct current source shown diagrammatically as a battery 42, is connected to charge a capacitor 43. Additionally, the capacitor 43 is connected in a discharge circuit through the alternate or second position of switch 41 to energize the relay 39 for actuation of load 40. In operation, the capacitor 43 will be rapidly charged to a full charge by battery 42. However, when moved to the relay energizing position, the capacitor 43 discharges in accordance with the time constant determined by the value of the capacitance of capacitor 43 and the inductance of the relay 39. The switch 41 is held in the discharging position sufficiently long to energize the relay 39 and provide a pulsed operation of the load 40. However, due to the action of the capacitor 43 the energy supplied to the relay 39 by any momentary closure which occurs if there is contact bounce will be insufficient to pull in the relay and actuate its contacts 39–1. Thus, in effect, the capacitor circuit provides an average power supply to the relay which essentially eliminates the effect of contact bounce.

More particularly, in the illustrated embodiment of the invention, the switch 41 is a singe pole, double throw unit having a contact arm 44 connected to one side of the capacitor 43, the opposite side of which is connected in common to one end of the relay 39 and to one side of the battery 42. The contact arm 44 alternately engages a charging contact 45 and a discharging contact 46. The contact 45 is connected in series with a resistor 47 to the free or opposite side of the battery 42 from that of capacitor 43. The contact arm 44 is selectively positioned to engage contacts 45 and 46 by a pulse generating unit 48 which is illustrated in FIG. 2 as including a motor-driven cam 49 acting against the force of a spring 50 connected to urge the arm 44 into engagement with contact 46. Cam 49 is rotated in accordance with the load to be measured and is provided with periphery having two angularly spaced radii connected by a sharp radial edge 51. With the larger radius operative or acting on arm 44, the arm engages contact 45. The smaller radius permits the spring 50 to move arm 44 into engagement with contact 46, with the transfer being quite rapid as a result of the radial cam edge 51.

When the pulse generating unit 48 holds the armature 44 in engagement with contact 45, a charging current is supplied to the capacitor 43. The charging time for the capacitor 43 is very short in comparison with the length of the time that the switch 41 is held in the charging position. Consequently, during each unit or cycle of load operation, a complete charge of the capacitor 43 is insured. During this same period, the armature 44 is moved into engagement with the contact 46 and connects the capacitor 43 directly across the coil of the relay 39. The capacitor 43 then discharges through the relay 39 to actuate contacts 39–1 and operate the counter 40. The switch 41 is held in discharging position for a period longer than necessary to operate the relay 39 after which it returns to the charging position. The relay 39 remains energized as long as the capacitor 43 can supply sufficient energy to it. As a result, the relay 39 is energized a single time for each cycle of the switch 41. When the contact arm 44 moves into engagement with contact 46, any contact bounce effect with a momentary contact closure does provide sufficient energy to the relay to actuate contacts 39–1. However, the switch is held in the charging position substantially longer than the time required to discharge capacitor 43 and consequently switch will settle to the discharging position to effect the desired operation of the relay 39 and therefore the counter 40.

The present invention thus provides a reliable and long life system for eliminating the effects of switch contact bounce and producing a contact closure for a fixed time interval for each switch actuation.

Various modes of carrying out the invention are contemplated as being within the scope of the following claims particularly pointing out and distinctly claiming the subject matter which is regarded as the invention.

I claim:
1. In a pulse actuated system,
   a pair of opposed contacts,
   means to rapidly move the contacts into engagement,
   a monostable multivibrator formed by a pair of common emitter connected transistors coupled by degenerative coupling means to provide an output signal of a selected duration,
   circuit means connecting said contacts to the input of the transistor and including an electrical timing circuit to isolate the circuit from transient signals,
   an output load, and
   a direct coupled emitter follower having an input connected to the output of the multivibrator and having an output cennected to the output load to energize the load for the duration of the output signal of said monostable multivibrator and essentially independently of the period such contacts are engaged.

2. In the pulse actuated system of claim 1 wherein said pair of transistors includes a first transistor having its base connected to the contacts and a second transistor having its base interconnected to the collector of the first transistor by a timing capacitor and its collector connected to the base of the first transistor by an impedance, said first transistor normally being beld nonconducting and said second transistor being normally held conducting, closure of said contacts turning on said first transistor which is then held on for the discharge period of said capacitor and said second transistor is correspondingly held off for a corresponding period.

3. In a pulse generating and transmitting circuit,
   contacts having leads for connection in series circuit with a power source,
   means coupled cyclically and momentarily actuate the contacts, said actuation being such as to cause said contacts to bounce and generate multiple opening and closing of the circuit for an actuation thereof
   a monostable multivibrator having an input means responsive to an input pulse of a selected duration and creating an output pulse of a selected longer duration in response thereto, and
   an electrical load connected to the output of the monostable multivibrator for a single energization upon each actuation of the contacts only for the duration of said output pulse.

4. In the pulse generating and transmitting circuit o claim 3 wherein said multivibrator includes a pair o common emitter connected transistors, said pair of tran sistors includes a first transistor having its base connecte to the contacts and a second transistor having its bas interconnected to the collector of the first transistor by timing capacitor and its collector connected to the base o the first transistor by an impedance, said first transisto normally being held nonconducting and said second tran sistor being normally held conducting, closure of sai contacts turning on said first transistor which is then hel on for the discharge period of said capacitor and sai second transistor is correspondingly held off for a corresponding period.

References Cited

UNITED STATES PATENTS

| | | | |
|---|---|---|---|
| 3,069,907 | 12/1962 | Eddy | 73—229 |
| 3,093,973 | 6/1963 | Williams | 73—229 X |
| 3,119,201 | 1/1964 | Brown et al. | |
| 3,230,394 | 1/1966 | Kintner. | |
| 3,233,124 | 2/1966 | Favin. | |

ORIS L. RADER, *Primary Examiner.*

T. B. JOIKE, *Assistant Examiner.*

UNITED STATES PATENT OFFICE
CERTIFICATE OF CORRECTION

Patent No. 3,333,111                                July 25, 1967

Tim H. Houle

It is hereby certified that error appears in the above numbered patent requiring correction and that the said Letters Patent should read as corrected below.

Column 6, line 26, after "the" insert -- one --; line 31, for "cennected" read -- connected --; same column 6, line 41, for "beld" read -- held --.

Signed and sealed this 12th day of November 1968.

(SEAL)
Attest:

Edward M. Fletcher, Jr.                            EDWARD J. BRENNER
Attesting Officer                                    Commissioner of Patents